Patented Feb. 10, 1942

2,272,840

UNITED STATES PATENT OFFICE 2,272,840

SELECTIVITY BY PHASE QUADRATURE METHOD

John Hays Hammond, Jr., and Ellison S. Purington, Gloucester, Mass., said Purington assignor to said Hammond, Jr.

Application January 30, 1940, Serial No. 316,428

18 Claims. (Cl. 250—8)

This invention relates to a system for the transmission of intelligence by radiant energy and more particularly to a selective system which operates on the phase relationship of two transmission channels.

The invention also relates to a transmission system which cannot readily be interfered with by the usual type of radiant energy transmitter and the messages of which cannot be interpreted by the use of the usual type of radiant energy receivers.

The invention further relates to a transmission system in which two channels are provided by the use of a carrier and first order side bands to produce at the receiver two currents of the same frequency but the phase relationship of which is controlled at the transmitter.

The invention further provides means at the receiver for automatically comparing the two currents as to phase and an indicating circuit is provided which is non-responsive when the two currents are either in phase or in phase opposition, but gives a maximum response when the two currents are in phase quadrature.

The invention also consists in certain new and original features of construction and combinations of parts hereinafter set forth and claimed.

Figure 1:
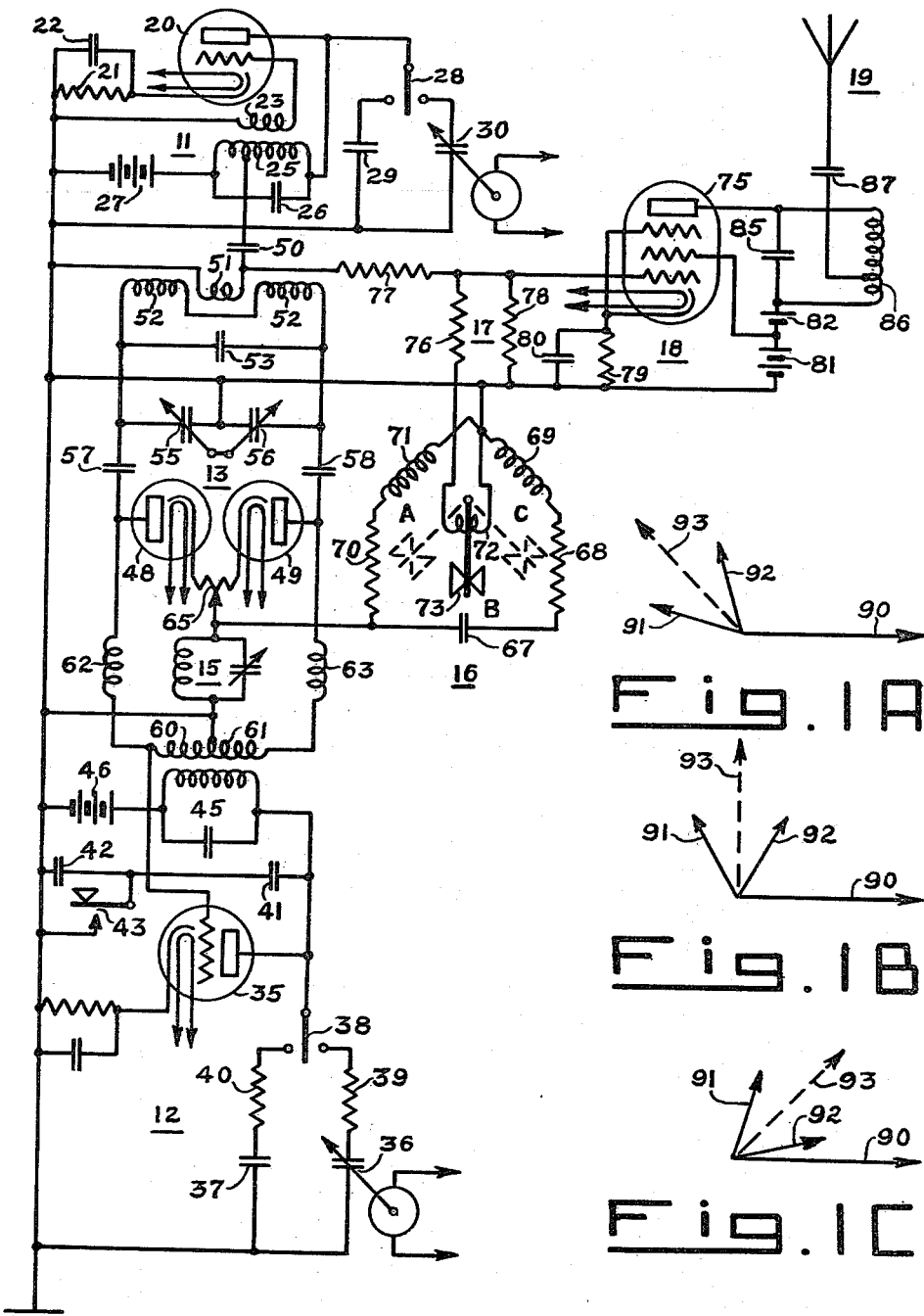
Figure 2:
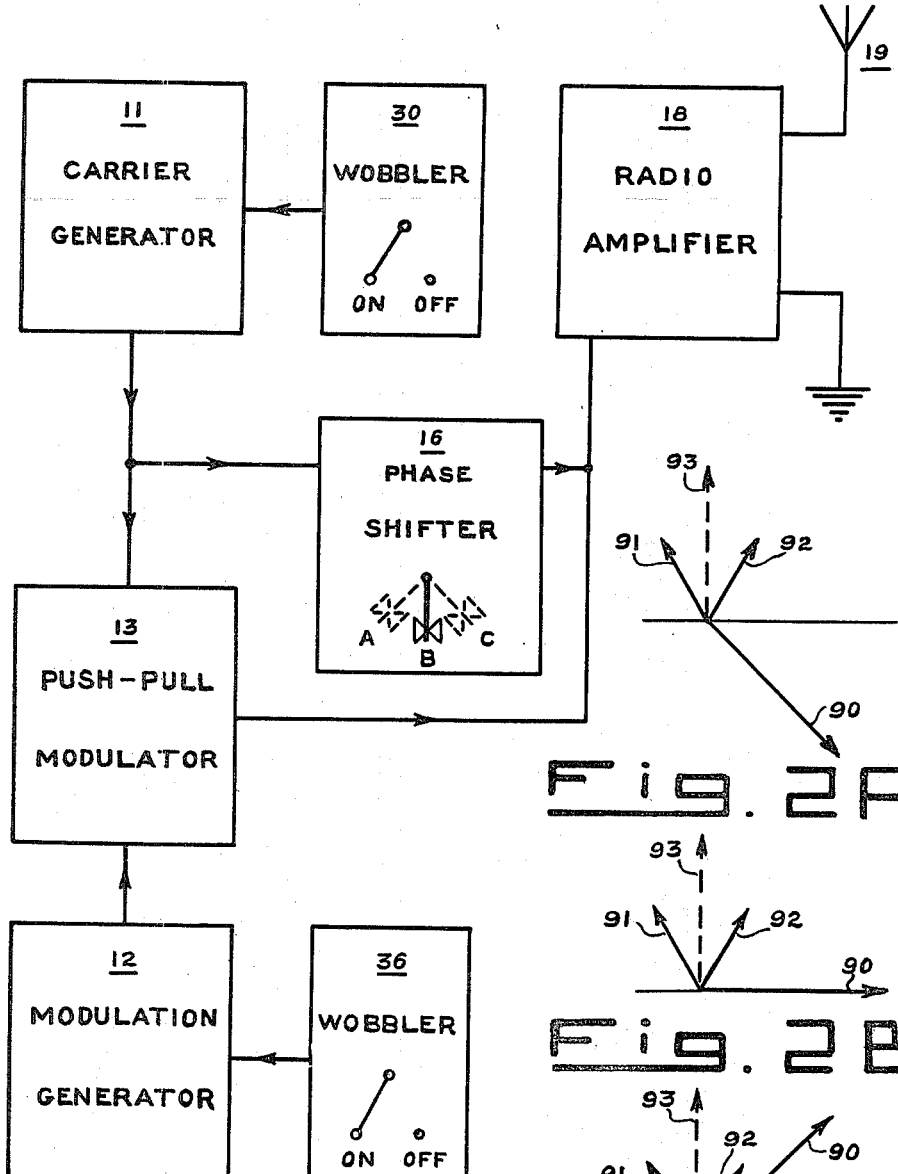
Figure 3:
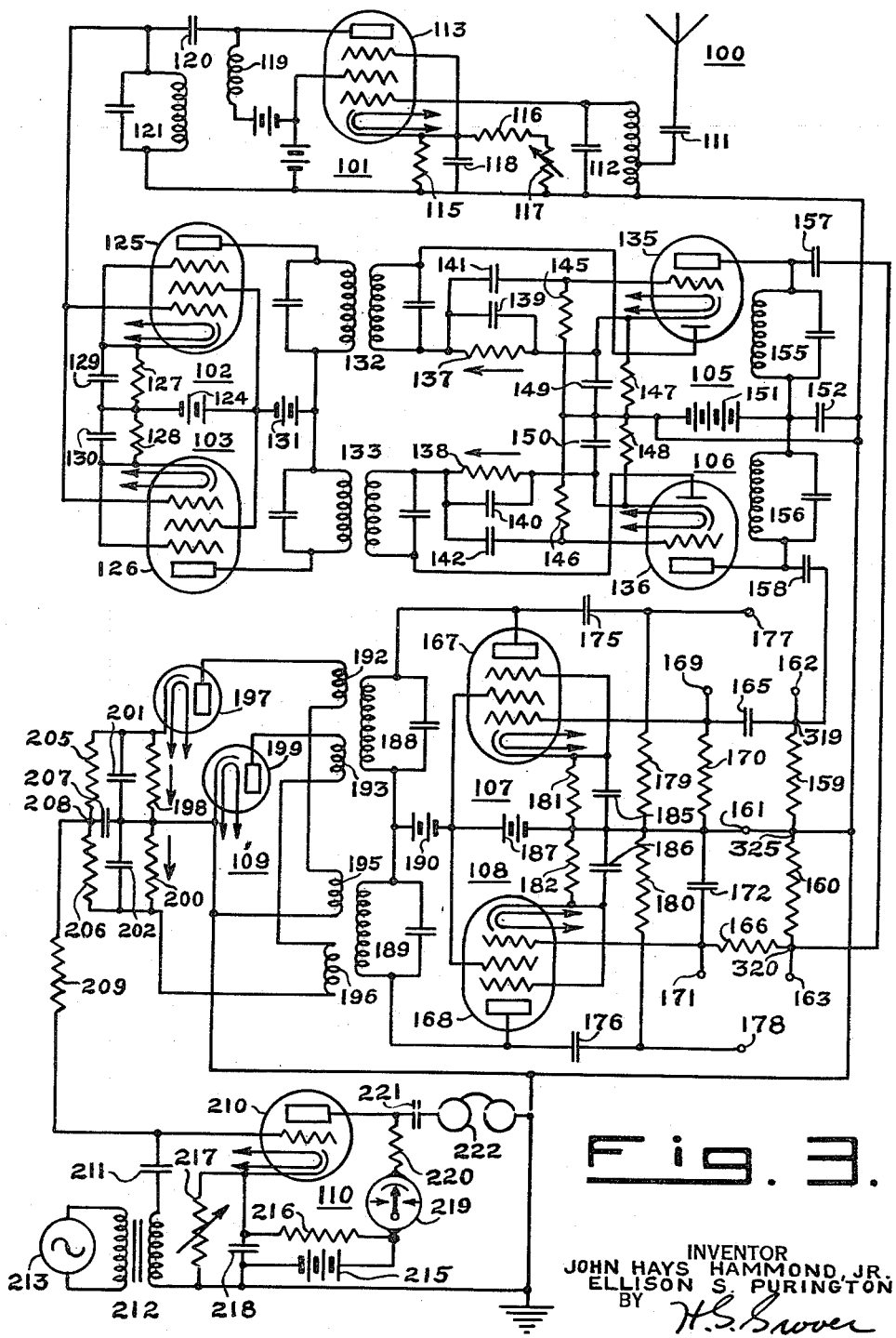
Figure 3A:
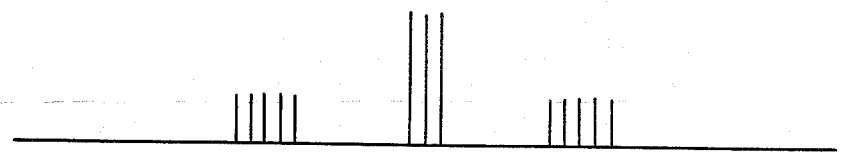
Figure 3B:
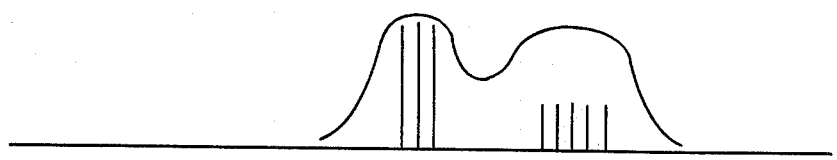
Figure 3C:
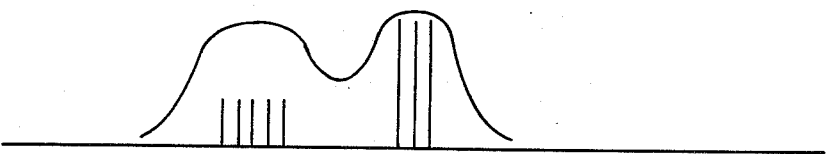
Figure 4A:
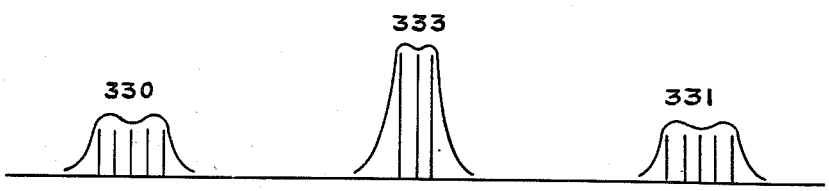
Figure 4:
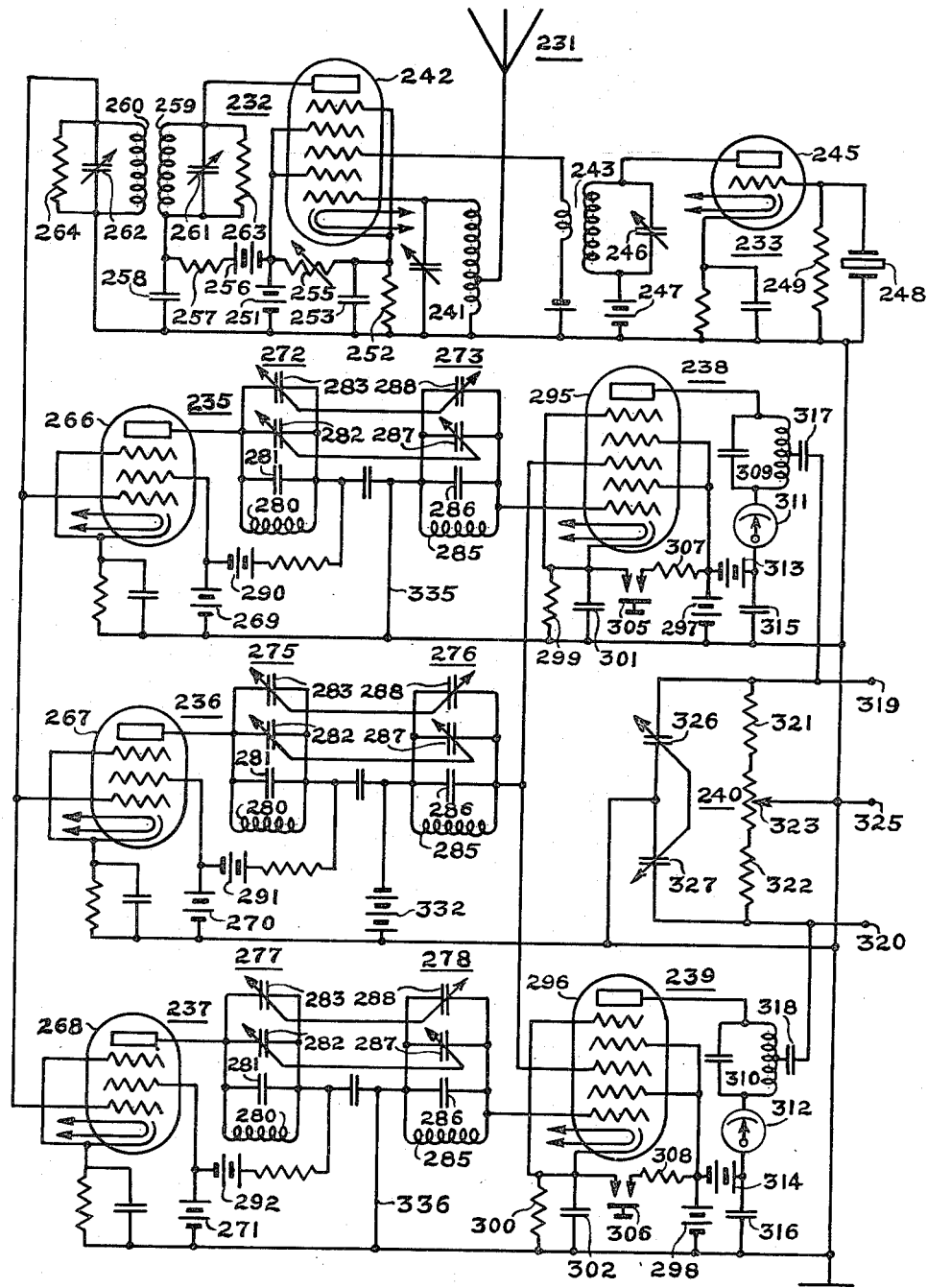

Although the novel features which are believed to be characteristic of this invention will be particularly pointed out in the claims appended hereto, the invention itself, as to its objects and advantages, the mode of its operation and the manner of its organization may be better understood by referring to the following description taken in connection with the accompanying drawings forming a part thereof, in which Fig. 1 illustrates diagrammatically the invention as applied to a transmitter in which the side bands are shifted for signalling;

Figs. 1A, 1B, and 1C show the phase relationships of the carrier and first order side bands when the latter are shifted for signalling;

Fig. 2 illustrates diagrammatically a modified form of transmitter in which the carrier is shifted for signalling;

Figs. 2A, 2B, and 2C show the phase relationships of the carrier and first order side bands when the former is shifted for signalling;

Fig. 3 illustrates diagrammatically a receiver for receiving signals from the transmitters depicted in Fig. 1 or 2;

Figs. 3A, 3B, and 3C show the received antenna signal and its distribution to the various detectors in the receiver;

Fig. 4 shows diagrammatically a modified form of receiver in which three channels are used; and Fig. 4A depicts the distribution of the received signal to the three channels.

Like reference characters denote like parts in the several figures of the drawings.

In the following description and in the claims parts will be identified by specific names for convenience, but they are intended to be as generic in their application to similar parts as the art will permit.

Referring to the drawings, Fig. 1 shows a transmitter which includes a carrier energy generator 11, a spacing frequency generator 12, a push-pull modulator 13 which is fed from both generators 11 and 12, a modulation output circuit 15, a phase shifter 16, a mixing circuit 17, a power amplifier 18 and an antenna 19.

The carrier energy generator 11 is of the tuned plate type and includes a triode tube 20, the cathode of which is connected to ground through a cathode resistor 21 by-passed by a condenser 22. The grid of the tube 20 is connected to ground through a coil 23 which is coupled to a coil 25 which forms a tuned tank circuit with a condenser 26. A battery 27 provides plate current for the tube 20. The plate of the tube 20 is also connected to the blade of a single pole double throw switch 28 one contact of which is connected through a fixed condenser 29 to ground and the other contact through a motor driven variable condenser 30 to ground.

The spacing frequency generator 12 is arranged similarly to the carrier energy generator 11 and is provided with a triode tube 35 the plate of which may be selectively connected to a motor driven variable condenser 36 or a fixed condenser 37 by means of a single pole double throw switch 38. Resistors 39 and 40 may be connected in series with the condensers 36 and 37 if desired. Condensers 41 and 42 are connected between the plate of the tube 35 and ground, the condenser 42 being shunted by a key 43. A plate tank circuit 45 is provided and is connected in series with a plate battery 46.

The push-pull modulator 13 is of the diode type such as that disclosed in the copending application of Ellison S. Purington Serial No. 283,020, and is provided with two diode tubes 48 and 49. The tank circuit 25—26 is connected through a blocking condenser 50 to a coupling coil 51, which is coupled to a split coil 52. Connected across the coil 52 is a condenser 53 and two equalizing condensers 55 and 56 which are operated in unison but in opposite directions. This circuit is connected to the plates of the diodes 48 and 49 through blocking condensers 57 and 58.

The tank circuit 45 is coupled to the tubes 48 and 49 by coils 60 and 61, the former being connected to the grid of the tube 35 serves as a feedback coil. The coils 60 and 61 are connected through chokes 62 and 63 to the plates of the diodes 48 and 49. The cathodes of the diodes 48 and 49 are connected together by a potentiometer 65, the adjustable tap of which is connected to ground through the modulator output circuit 15.

The phase shifting circuit 16 comprises a condenser 67 one side of which is connected to the potentiometer 65 and the other side to a resistor 68 in series with a coil 69 forming one path across the modulator output circuit 15. The other path is formed by a resistor 70 and coil 71 in series. The coils 69 and 71 are mounted with their axes at right angles, so that there is no mutual inductance between them and an output coil 72 is rotatably mounted in the space between the coils 69 and 71 and is rotated to any one of three positions 45° apart A, B, or C by means of a key 73.

The power amplifier 18 is shown as provided with a pentode tube 75 the first grid of which is connected to the output coil 72 through a resistor 76 and to the condenser 59 through a resistor 77. A resistor 78 is connected from the grid of the tube 75 to ground and a resistor 79 and condenser 80 in parallel are connected from the cathode and third grid to ground. Batteries 81 and 82 are provided as screen and plate power sources. The output circuit of the tube 75 includes a tank circuit comprising a condenser 85 and an inductor 86 the latter being connected to the antenna 19 through a condenser 87.

In the operation of the form of the invention disclosed in Fig. 1 the carrier generator 11 produces the carrier energy the frequency of which is chiefly determined by the tuned tank circuit 25—26. Grid bias for the tube 20 is provided by current flowing through cathode resistor 21 due to the space current through the tube 20 from the battery 27. If it is desired to keep the frequency of the carrier energy fixed the switch 28 is thrown to the left thus connecting the fixed condenser 29 in the plate circuit of the tube 20. When it is desired to wobble the carrier energy the switch 28 is thrown to the right thus connecting the motor driven variable condenser 30 in the circuit. Preferably the condensers 29 and 30 are so adjusted that with the condenser 29 in circuit the generated frequency is the average of the extreme frequencies that are generated when the condenser 30 is in circuit and is slowly rotated.

The spacing frequency generator 12 produces the spacing frequency energy which determines the spacing of the side bands from the carrier. If it is desired to keep this frequency constant the switch 38 is thrown to the left thus connecting the fixed condenser 37 in the plate circuit of the tube 35. When it is desired to wobble this frequency the switch 38 is thrown to the right thus connecting the motor driven variable condenser 36 in the circuit. Resistors 39 and 40 may be used in series with the condensers 36 and 37 so that the output energy is independent of which condenser is used. The condenser 37 may be so chosen that the fixed frequency is the average of the wobbled frequency.

Energy is fed to the plates of the diodes 48 and 49 from the carrier generator 11 through the blocking condensers 57 and 58 and from the spacing frequency generator 12 through the chokes 62 and 63. The input to the diodes 48 and 49 may be tuned by the split coil 52 and condenser 53 together with the equalizing condensers 55 and 56 and may be so arranged that the radio frequency voltage to the plates of the diodes 48 and 49 may be suitably divided. This arrangement permits side band energy to be developed in the modulator output circuit 15 free from the carrier. Adjustments for tube inequalities may be provided by condensers 57 and 58 and by potentiometer 65. It has not been found necessary to establish the circuits 52, 53, 55 and 56 at any fixed potential with respect to ground, but if desired condensers 55 and 56 may be bridged by high resistors one or both of which may be variable. The operation of this part of the invention is described in more detail in the copending application of Ellison S. Purington Serial No. 283,020.

The phase shifting circuit 16 which is of a continuously variable type may be operated by key 73 which is used for purposes of signalling and is here shown in the mean position B from which it may be moved substantially 45° to the right into position C or 45° to the left into position A. The coils 69 and 71, which are mounted at right angles to each other, carry currents in phase quadrature and the rotatably mounted output coil 72 may be coupled to either coil 69 or 71 or both so that any desired phase relation may be caused to exist between the voltage across the coil 72 and the modulation output circuit 15. It is to be understood that the coil 72 may be adjusted to give any desired angle of coupling with coil 71 for position B of the key and that the range of phase relations may be other than indicated in the present diagram.

The power amplifier 18 receives carrier energy through the resistor 77 from the generator 11 and side band energy through the resistor 76 from the phase shifter 16. The resistors 76, 77 and 78 may be so proportioned as to give a suitable compromise between the signal on the grid of the tube 75 and the reactions of the two sources of grid signal on each other. The output of the power amplifier 18 is fed through the output tank circuit 85—86 and condenser 87 to the antenna 19.

Figs. 1A, 1B, and 1C depict the nature of the carrier and side bands radiated by the antenna 19 for the three positions A, B and C of the key 73. At the instant of operation shown in these three figures the carrier vector 90 is at zero phase angle and the side band vectors 91 and 92 are separated by 60 electrical degrees. The vector sum of the side band vectors is shown by the dotted line 93 which leads the carrier vector 90 by 135°, 90°, and 45° when key 73 is in positions A, B and C respectively.

In Fig. 1B the carrier and side band energy are related in a manner similar to the relation of the carrier and first order side bands of a phase or frequency modulated signal such as that shown in the "Side band reversal system" of Patents 1,935,776 and 1,976,393 to John Hays Hammond, Jr. The result of detecting carrier 90 and side band 92 would be a current which is 180° out of phase with that produced by detecting carrier 90 and side band 91.

The signals depicted in Figs. 1A and 1C are intermediate in characteristics between those shown in Fig. 1B and those of an amplitude modulated signal. In either case of the signals shown in Figs. 1A and 1C the two sets of detected currents would be in phase quadrature one set leading the other by 90° for the signal shown in Fig. 1A and the other set leading by 90° for the signal shown in Fig. 1C.

It is to be understood that the rotor coil 72 may be so adjusted with respect to the stator coils 69 and 71 that for the mean position B of the key 73 other relations will hold for the radiated energy than those depicted in Figs. 1A, 1B, and 1C. Thus it may be so arranged that for the mean position B of the key the vector sum of 91 and 92 would be along the line 90 or 180° from this line. In any of these cases, however, for positions A and C of the key 73 the vector 93 would make an angle of 45° or 135° either positive or negative with respect to the vector 90. The system is so organized that no signal results in the receiver indicator whenever the dotted vector sum 93 of 91 and 92 is 0°, 90°, 180°, or 270° from the vector 90 and that maximum effect is produced when this difference between the vectors 93 and 90 is 45°, 135°, 225°, or 315°.

In Fig. 2 is shown a blocked in diagram of a transmitter which is similar to that depicted in Fig. 1 and is used for the same purposes, the only difference being that the phase shifter 16 is connected so as to vary the phase of the carrier and not that of the side band frequency. As shown in Figs. 2A, 2B, and 2C the vector sum 93 of the vectors 91 and 92 is of fixed phase and the carrier phase as indicated by the vector 90 is shifted in accordance with the position of the phase shifter key 73.

The general results are the same as those produced by the transmitter depicted in Fig. 1 in which the carrier is fixed and the side bands are phase modulated at the dot-dash frequency in accordance with the keying. In either case if the carrier wobbler 30 is operated and is of suitable design to include dot-dash wobble as well as continuous wobble, the intelligence conveyed by the phase shifting key 73 cannot be revealed by a receiver for dot-dash amplitude modulated continuous wave.

It is to be understood that the invention as depicted by Fig. 2 does not relate to the details of any of the several devices employed as indicated by the boxes of the diagram but relates to the coordination of these devices with each other to produce the desired effects and the coordination of the transmitter and the receiver.

The receiver shown in Fig. 3 comprises an antenna 100, a preamplifier 101, two amplifiers 102 and 103, two detectors 105 and 106, two amplifiers 107 and 108, an electronic type phase comparator 109 and an indicating circuit such as a keyed amplifier 110.

The antenna 100 is connected through a series condenser 111 and a tuned circuit 112 to the input circuit of a pentode tube 113 which is provided with manual volume control by the use of cathode resistors 115, 116 and rheostat 117 with by-pass condenser 118. The plate of the tube 113 is connected to power supply through a choke 119 and through a blocking condenser 120 and tuned circuit 121 to the input circuits of the amplifiers 102 and 103. These amplifiers comprise pentode tubes 125 and 126 which are suitably biased by cathode resistors 127—128 by-passed by condensers 129—130. Batteries 124 and 131 of low internal impedance supply screen and plate voltage to both amplifier channels, but otherwise these channels are independent.

The output circuits of the amplifiers 102 and 103 are coupled by tuned transformers 132 and 133 to the diode elements of tubes 135 and 136 which form part of the rectifier circuits of the detector amplifiers 105 and 106. These rectifier circuits also include resistors 137 and 138 and condensers 139 and 140. These resistors and condensers are so proportioned as to present high impedance to the direct current and detected current constituents of the diode current, but to present low impedance to the radio frequency components. The resistors 137 and 138 are connected through blocking condensers 141 and 142 to the grids of the tubes 135 and 136, which are connected to ground through resistors 145 and 146. The cathodes of the tubes 135 and 136 are connected to ground through resistors 147 and 148 and condensers 149 and 150. A battery 151 is provided for supplying plate current to both tubes 135 and 136 and is by-passed to ground by condenser 152.

It is to be understood that in general matched condensers and resistors are used for the detector devices 137 to 150 so that detected currents will be similarly shifted by the detector circuit and the detector to amplifier coupling circuit.

The output circuits of the tubes 135 and 136 include tuned circuits 155 and 156, which are preferably identical in nature, and are connected through blocking condensers 157 and 158 to resistors 159 and 160. These resistors are connected to test terminals 161, 162 and 163. The resistors 159 and 160 are connected through condenser 165 and resistor 166 to the first grids of two pentode tubes 167 and 168, which form part of the amplifiers 107 and 108. The condenser 165 is connected to test point 169 and through resistor 170 to ground and the resistor 166 is connected to test point 171 and through condenser 172 to ground.

The plates of the tubes 167 and 168 are connected through blocking condensers 175 and 176 to test points 177 and 178 which are connected through high valued resistors 179 and 180 respectively to ground point 161. Cathode bias resistors 181 and 182 are provided and are shunted by condensers 185 and 186 respectively. A screen battery 187 is connected to the second or screen grids of the tubes 167 and 168.

The output circuits of the tubes 167 and 168 include tuned plate tank circuits 188 and 189 and plate battery 190. The tank circuit 188 is coupled to two coils 192 and 193 and the tank circuit 189 is coupled to two coils 195 and 196 the latter being reverse wound as indicated. The two coil systems 192, 193 and 195, 196 are identical and the couplings are identical with the exception of the reversal of the coil 196. The coils 192 and 195 are connected in series with a diode 197 and a load resistor 198 and the coils 193 and 196 are connected in series with a diode 199 and a load resistor 200. The load resistors 198 and 200 are by-passed by condensers 201 and 202. The diodes 197 and 199 and the resistors 198 and 200 are of like construction and are electrically equal.

Equal resistors 205 and 206 of high impedance compared with resistors 198 and 200 are bridged in series from the positive end of resistor 198 to the negative end of resistor 200 and a condenser 207 is connected between the junction point 208 of resistors 205 and 206 and ground. Connected to point 208 is one side of a high impedance resistor 209 the other side of which is connected to the grid of a triode tube 210 which is included in the circuit of the amplifier 110. Connected between the grid of the tube 210 and ground is a blocking condenser 211 and the secondary of a transformer 212 the primary of which is connected to a source of alternating tonal voltage 213.

The tube 210 is provided with a plate battery 215 which is bridged to ground by a fixed resistor 216 in series with a variable resistor 217, the latter being by-passed by a condenser 218. Between the positive end of the battery 215 and the plate of the tube 210 is connected a plate meter 219 and a coupling resistor 220. Connected between the plate of the tube 210 and ground is a blocking condenser 221 and a pair of head phones 222.

Radiations from either of the transmitters shown in Figs. 1 or 2 are impressed upon the antenna 100 and the received energy passes through the series condenser 111 and is selectively impressed by the tuned circuit 112 upon the grid of the tube 113 where it is amplified. This amplified energy is selectively impressed, by the use of the choke 119, blocking condenser 120 and tuned circuit 121, upon the grids of the tubes 125 and 126 of the amplifiers 102 and 103.

The output of the amplifier 102 is selectively treated by the tuned circuits of the transformer 132 whereby the carrier and upper side band energy is impressed upon the diode element of the tube 135 and the rectified output comprising the direct current and the detected current passes through the resistor 137 and condenser 139. The resistor 137 and condenser 139 are so proportioned as to present high impedance to direct current and detected current constituents of the diode current, but to present low impedance to the radio frequency components. The strength of the direct current through the resistor 137 is indicated by the arrow and may be taken as a measure of the radio frequency energy impressed upon the diode. The detected output of the diode is impressed through the blocking condenser 141 upon the grid of the amplifier portion of the tube 135. This grid is maintained at ground D. C. potential by the use of the shunting resistor 145 and the cathode of the tube 135 is suitably positively biased with respect to ground by cathode resistor 147 and condenser 149.

The output of the amplifier 103 undergoes similar but different treatment by the selectively tuned transformer 133 detector 106 and associated circuits, which transmit carrier and lower side band energy to the tube 136. It is thus seen that the detector 105, for example, is actuated in accordance with the carrier and upper side band energy as depicted in Fig. 3B and that the detector 106 is actuated by the carrier and lower side band energy as shown in Fig. 3C. With these circuits properly adjusted the voltage produced by detection at the tube 135 will be 90° different from that produced at the tube 136 for either position A or C of the phase shifting key 73 of the transmitter shown in Fig. 1. For one position A of the key 73 the voltage for the tube 135 will, for example, lead the voltage for the tube 136 and in the other position C the voltage for the tube 135 will lag the voltage for the tube 136.

It is to be understood that the tuned circuits produce changes of phase of some or all of the three radio frequency bands impressed upon the antenna, but the circuits in general are so organized and adjusted that lags of one side band with respect to the carrier are compensated by advances of the other side band with respect to the carrier, so that the relative phases of the detected currents in the resistors 137 and 138 are the same as the relative phases would have been if no radio frequency shifts had occurred. It is also to be understood that matched condensers and resistors are to be used in the circuits of the detectors 105 and 106 so that the detected currents will be similarly shifted by the detector circuit and the detector to amplifier coupling circuit.

The energy impressed on the grid resistors 145 and 146 is amplified by the tubes 135 and 136, the outputs of which are tuned by the circuits 155 and 156, which are preferably identical in nature. In case the wobbler is used these circuits may be tuned off center and a later circuit tuned off center in the opposite sense.

The amplified energy is impressed through blocking condensers 157 and 158 upon the resistors 159 and 160 between the test terminals 162 and 163. The phase advancing network 165, 170 is so designed that the voltage of test point 169 with respect to ground point 161 leads the voltage of test point 162 with respect to ground point 161 by 45°. The phase retarding network 166, 172 is so designed that the voltage of the test point 171 with respect to ground point 161 lags the voltage of test point 163 with respect to ground point 161 by 45°. The numerical values of the impedances of the elements 165, 166, 170 and 172 are all substantially the same for the mean spacing frequency and are all low compared with the input impedances of the tubes 167 and 168.

The signals impressed upon the grids of the tubes 167 and 168 are amplified by the amplifiers 107 and 108 the outputs of which are tuned by the plate tank circuits 188 and 189, which are of like construction. The output of the amplifier 107 is inductively transmitted to the coils 192 and 193 and the output of the amplifier 108 is inductively transmitted to the coils 195 and 196. All the coils 192, 193, 195 and 196 have the same numerical mutual inductance with the coils of the tank circuits 188 and 189.

The D. C. current flowing through the rectifier 197 is derived from the coils 192 and 195 and may be considered to correspond to the vector difference of the plate voltages of the tubes 167 and 168 and the D. C. current flowing through the rectifier 199 is derived from the coils 193 and 196 and may be considered to correspond to the vector sum of the plate voltages of the tubes 167 and 168. Since the vector sum of the two voltages is numerically equal to the vector difference of these same two voltages, if these two voltages are quadrature related and if the two rectifier systems are of like constants, the D. C. currents in the resistors 198 and 200 will be equal if the plate voltages of the tubes 167 and 168 are quadrature related in either a positive or negative sense. This is true regardless of the magnitude of the two voltages. If the two plate voltages are in phase or 180° out of phase and substantially equal one of the D. C. output currents will be large and the other small so that by comparing the values of the currents in the resistors 198 and 200 the phase relationships of the plate voltages will be indicated.

The junction point 208 in the steady state conditions is at ground potential if the currents in the resistors 198 and 200 are equal but will be positive or negative with respect to ground if these currents are unequal. The amplifier 110 serves in general to indicate the potential of the junction 208 either visually by the reading of the meter 219 or audibly by the signals in the head phones 222. Either of these indications will change in accordance with the change of grid bias due to changes of the currents in the resistors 198 and 200.

If the tube 210 is highly biased by making the variable resistance 217 of high value, space and tonal currents will pass only when the current through the resistor 198 is sufficiently greater than the current through the resistor 200. It is thus seen that the bias on the tube 210 and therefore its ability to pass plate current and to amplify the tonal signal is dependent upon the relative phases of the currents detected by the detectors 105 and 106 and therefore upon the position of the key 73 of the transmitter depicted in Fig. 1. Maximum change of bias of the tube 210 will occur when the phase shifting key 73 is moved from position A to position C. When the key 73 is in position B the outputs of the circuits 155 and 156 are in phase or in phase opposition and therefore the inputs to the tubes 167 and 168 are quadrature related so that no voltage is produced by the phase comparator circuit. The comparator output voltage developed when the key 73 is moved from position B to position A is in an opposite sense to that developed when the key 73 is moved from position B to position C.

It is to be understood that except for the null indication point when the currents in the resistors 198 and 200 are equal the condition of the tube 210 is dependent upon the signal strength as well as upon the phase relationships. This effect may be minimized by automatic volume control devices by which the total rectified energy of the comparators controls the grid of the tubes, such for example as the tubes 167 and 168. Other comparator circuits may be devised in which, for example, the phase is determined independently of the amplitude by comparing the sum of the rectified currents such, for example, as the currents in the resistors 198 and 200 with the difference of these same currents.

The lining up of the receiver is accomplished by the use of signals injected at certain test points and then observing the performance of the set at certain other test points. It is to be understood that special test equipment may be utilized for such purposes. Although many of the elements of the two receiver channels are shown as fixed, it is to be understood that any or all of them may be subjected to slight adjustments to compensate for manufacturing irregularities.

While it is preferable for test purposes that each portion of the receiver be lined up for equality of phase shifts it is to be understood that differences of one portion may be compensated for by differences at other portions. For example with a considerable range of spacing frequencies it is preferable that circuits 155 and 156 be similarly tuned, say, for example, at the lower extremity of the spacing frequency band and that circuits 188 and 189 be similarly tuned at the upper extremity of the spacing frequency band.

It is within the scope of the present invention, however, to have the circuits 155 and 156 tuned to the high and low extremities respectively of the spacing frequency band or vice versa and to have the circuits 188 and 189 tuned to low and high extremities, respectively, of the spacing frequency band or vice versa. There are many ways of adjusting the circuits with the end in view that the amplifier 110 will be non-responsive whenever the incoming radiation, as depicted in Fig. 3A represents either amplitude or phase modulation, but will be most responsive when the radiation is substantially intermediate between these two non-responsive conditions.

With this type of system it is impossible to receive the signals by the usual communication type and broadcast type receivers, especially if the spacing frequency is above audibility and the carrier wobbler is operative so that dot-dash phase changes of the radiation are hidden by the artificial frequency modulation. The signal cannot be received except by a receiver of the general type herein disclosed which segregates the two channels and is provided with a phase comparator. Receivers without the phase comparator will be unable to distinguish between the radiations of Figs. 1A and 1C.

A precision receiver of the type herein indicated can be made highly sensitive to slight changes in phase relationships so that signalling may be accomplished by very slight motions of the key 73 of Fig. 1. Many auxiliary devices may be used to still further improve the privacy of the system, such as interfering signals which would disturb the receivers of the type herein shown unless of high precision, or multiplex systems, or systems using the transmitter in conjunction with the receiver only on special occasions, but normally using the transmitter for the highly private and interference proof system of the type shown in the U. S. Patents 1,681,293 to John Hays Hammond, Jr., and 1,690,719 to Emery L. Chaffee et al. involving signalling not by phase change but by the use of the key 43 of Fig. 1.

Freedom from interference in this system results largely because transmitters and stray interferences do not currently exist for operating the receiver system. Most transmitters if modulated are of the amplitude modulation type, or phase or frequency modulation type none of which will operate this system. Stray disturbances are of random phase. Continuous wave transmitters are of a fixed frequency and can neither operate the receiver nor readily interfere with its operation from the proper transmitter in view of the variable frequency. Two continuous waves simultaneously operative with the correct spacing cannot readily disturb the operation of this system because energy from two such transmitters is not effectively received by both channels and signals in one channel only will not change the operation of the phase comparator indicator.

Random combinations of three continuous waves will not effectively interfere with this system because no two of the three possible difference frequencies will be equal so that the interferences will be averaged out by the operation of the condenser 207 over the duration of a dot or dash. While the arrangement herein shown is organized to be highly free from stray and intentional interferences it is to be understood that the use of more circuits tuned to the high frequency will further improve the ratio of necessary received energy of operation to undesired received energy.

While an interfering signal may not of itself operate a given receiver indicator it may upset the ability of the proper radiation to operate the receiver. This may occur if the interfering signal is so powerful that the tube amplifiers, detectors, rectifiers, etc., cease to have linear properties, so that the presence and absence of the interference changes the sensitivity of the receiver to the desired signal.

In the system disclosed in this invention the tube devices are operated for the desired signal at far below their signal handling ability, so that the devices to which the interference penetrates are not subject to ready overloading.

The circuits depicted in this invention are suitable for use with moderately short waves for which it is technically practicable to construct the various devices such, for example, as phase shifters, differentially selected circuits, etc., which it would not be practical to do for ultra high frequencies. It is to be understood, however, that it is within the scope of the present invention that the system may be operable at ultra high frequencies by stepping up the signals impressed upon the tube 75 of Fig. 1 to ultra high frequency, for example, by the use of a suitable transmitter frequency converter and by stepping down the received radiations to a range suitable to operate the tube 113 by the use of a receiver frequency converter.

In Fig. 4 is depicted a modified form of receiver which comprises an antenna 231, a converter 232, a heterodyne 233, three amplifiers 235, 236 and 237, two mixing circuits 238 and 239 and a compensating circuit 240.

The antenna 231 is connected through a tuned circuit 241 to the first grid of a pentagrid tube 242 which is included in the converter circuit 232. The third grid of the tube 242 is connected to the heterodyne 233 by means of a transformer 243 the primary of which is connected in the plate circuit of a triode tube 245 and is tuned by means of a variable condenser 246. Plate energy is supplied by a battery 247. The heterodyne 233 is controlled by means of a piezo-electric crystal 248 which is shunted by a resistor 249.

The second and fourth grids of the tube 242 are positively polarized by a battery 251 and the fifth grid is connected to the cathode which is grounded through bias resistor 252 shunted by condenser 253. Volume control is afforded by rheostat 255 which is connected to the positive side of battery 251. Plate power is provided by batteries 251 and 256 through resistor 257 which with condenser 258 form a filter network. The plate circuit of the tube 242 is coupled to the amplifiers 235, 236 and 237 by a broadly tuned coupled system comprising inductively coupled coils 259 and 260 which are shunted by variable condensers 261 and 262 and ballast resistors 263 and 264.

The amplifiers 235, 236 and 237 include three pentode tubes 266, 267 and 268 the first grids of which are connected to the output circuit of the converter 232. The third grids of the tubes 266, 267 and 268 are connected to the cathodes and the second grids are connected through batteries 269, 270 and 271 to ground. The output circuits of the tubes 266, 267 and 268 include inductively coupled plate circuits 272—273, 275—276 and 277—278 respectively. Each of the primary circuits 272, 275 and 277 comprises an inductance 280, a fixed condenser 281 and two variable condensers 282 and 283. Each of the secondary circuits 273, 276 and 278 comprises an inductance 285, a fixed condenser 286 and two variable condensers 287 and 288. The variable condensers 282 and 287 are connected together so as to operate in the same sense and the variable condensers 283 and 288 are connected together so as to operate in opposite senses. Plate power for the tubes 266, 267 and 268 is provided by batteries 269—290, 270—291 and 271—292 respectively.

The mixing circuits 238 and 239 include pentagrid tubes 295 and 296 the first grids of which are connected to the secondary plate circuits 273 and 278 and the third grids to the secondary plate circuit 276. The screen grids of the tubes 295 and 296 are connected through batteries 297 and 298 to ground and the cathodes are connected to ground through resistors 299 and 300 by-passed by condensers 301 and 302 respectively. The cathodes of the tubes 295 and 296 are connected through push buttons 305 and 306 and resistors 307 and 308 to the positive ends of the batteries 297 and 298.

The plates of the tubes 295 and 296 are connected to tuned circuits 309 and 310 the other sides of which are connected through meters 311, 312 and plate batteries 313 and 314 to the positive ends of the batteries 297 and 298. The batteries 297, 313 and 298, 314 are by-passed by condensers 315 and 316 respectively.

The tuned circuits 309 and 310 are connected through condensers 317 and 318 to terminals 319 and 320 which are bridged by fixed resistors 321 and 322 and potentiometer 323. The adjustable contact of the potentiometer 323 is connected to ground terminal 325. The terminals 319 and 320 are bridged to ground by variable condensers 326 and 327 which are connected together so as to operate in opposite senses. The terminals 319, 320 and 325 may be connected to the phase shifting amplifiers 107 and 108 shown in Fig. 3 by connecting them to like numbered terminals in that figure.

Radiations from either of the transmitters shown in Figs. 1 or 2 are impressed upon the antenna 231 and the received energy is tuned by circuit 241 and is impressed on first grid of the tube 242. The high frequency source of the transmitter is chosen not too high to prevent practical phase shifting circuits to be constructed and not too low to prevent effective modulation with simple modulation output circuits. The receiver tube 242 serves as a converter to a lower frequency to permit much more effective separation of the side bands from each other than is possible with the direct arrangement shown in Fig. 3. Heterodyne energy is generated by the heterodyne 233 which functions in a well known manner and is controlled by the piezo-electric crystal 248. This energy is impressed upon the third grid of the tube 242 which acts as a converter to step down the incoming energy to a suitable workable frequency using well known principles of conversion. After stepping down the three constituents have the same general amplitude and phase relationships but they are relatively spaced farther apart in frequency.

Energy from the converter tube 242 passes through the broadly tuned circuits 259—264 and is impressed upon the first grids of the amplifier tubes 266, 267 and 268. This coupling system is lined up to transmit the converted signals to the three amplifiers 235, 236 and 237 with little discrimination preferably favoring the transmission of the side band constituents. The converted energy is amplified by the amplifiers 235, 236 and 237 and is selectively treated by the coupled plate circuits 272—278 in such a way that energy representing the upper side band is impressed upon the first grid of the mixer tube 295, energy representing the lower side band is impressed upon the first grid of the mixer tube 296 and energy representing the carrier alone is impressed upon the third grids of both the tubes 295 and 296.

In lining up the condensers 283 and 288 are adjusted to give symmetrical transmission with two similar humps of transmission and condensers 282 and 287 are then adjusted to center the double hump transmission curve on the high channel band as depicted at 330 in Fig. 4A. This system of double condensers facilitates adjustment to give symmetry of transmission and proper location of the center of transmission. In a similar manner the coupling circuits 277 and 278 are adjusted to give symmetrical transmission centered on the low channel as depicted at 331 in Fig. 4A. The output of the amplifier 236 is similarly tuned to the central or mean channel, and the secondary circuit 276 is provided with a bias battery 332. The curve of transmission of this channel is shown at 333 in Fig. 4A. It is to be understood that the lining up of the circuits may be accomplished by those skilled in the art with the aid of test apparatus and the system may be provided with aids for this line up as will be described later.

The first grid of the tube 295 receives energy from the high frequency channel and the third grid receives energy from the mean frequency channel and operates as a detector similar to the tube 242 except that lower frequencies of input and output are used. The tube 296 receives energy in a similar manner from the low and means frequency channels and also operates as a detector.

The detected outputs of the tubes 295 and 296 are of a frequency corresponding to that of the generator 12 shown in Fig. 1 and are tuned by circuits 309 and 310 with the test meters 311 and 312 indicating the D. C. plate current from batteries 297, 313 and 298, 314 respectively. The bias on the tubes 295 and 296 may be increased for test purposes by operating the push buttons 305 and 306 which cause additional bias current from the batteries 297 and 298 to pass through the resistors 307 and 308. The meters 311 and 312, push buttons 305 and 306 and resistors 307 and 308 are for test purposes for lining up the circuits with a standard signal generator and with the meters 311 and 312 indicating the transmission curve as the frequency of the generator is varied.

The outputs from the circuits 309 and 310 are fed through the condensers 317 and 318 to the terminals 319 and 320 with one circuit from terminal 319 to ground terminal 325 fed to the phase shifting amplifiers 107, shown in Fig. 3, and the other circuit from terminal 320 to ground terminal 325 fed to the other phase shifting amplifier 108. The subsequent circuits by themselves may be lined up so that phase comparator balance is established to a high degree of accuray over the range of the modulated wobbled frequency with the two channels excited in phase.

When the system is driven in phase from a spacing frequency test voltage, inserted for example in ground leads 335 and 336, the accuracy of balance may be upset due to differences of the tuning of the output circuits and differences of effective decrement coefficients. The compensating circuit including the resistors 321 and 322, the potentiometer 323 and the condensers 326 and 327 is provided to permit the best adjustment for balance over the entire range. By adjusting the potentiometer 323 and condensers 326 and 327 the comparator balance may be adjusted to the best fidelity over the wobbled range so that it will be influenced as little as possible when the detected outputs of the tubes 295 and 296 are in phase and will be influenced very strongly when these outputs are in phase quadrature.

It is thus seen that in the system depicted in Fig. 4 the three channels can be tuned independently and that the separation is sufficient so that both the high and low frequency channels may be tuned for maximum detected output, under which conditions the channels will be properly centered. Both of these maxima may be increased by tuning the mid circuit output of the tube 267 which will center the mean channel. The independent tuning of the channels and the relatively wide separation of the channels permit a line up of the circuits in a simple manner, facilitating easy tune up and maintenance.

The final line up of the system must be made by radio frequency signals from the transmitter or a local modulated oscillator simulating the transmitter.

When the entire system is suitably lined up for phase for the radio and modulation frequency circuits, the system as a whole is substantially non-responsive when the incoming signals are amplitude modulated or phase modulated and highly responsive when the incoming signals are modulated with characteristics intermediate between amplitude and phase modulation.

The system as a whole is highly selective against continuous wave signals because of the wobbled nature of the transmitted radiations, whereby the interference does not harmfully match any of the transmitted radiations for more than a small percentage of the time of operation. It is highly selective against two continuous waves simultaneously operative because even when the difference of the two waves is such as to produce detected output in one channel the radio selectivity of the system prevents both channels from being operated so that null response results. The detected interference energy in one channel will not prevent the proper operation of the desired signal because of the modulation frequency wobble whereby the detected interference frequency does not harmfully match the detected message frequency for an appreciable portion of the time.

The system is highly free from interference by three unrelated continuous waves which match the incoming radiations sufficiently closely so that the three channels all carry extraneous energy. This is so because the unrelated waves will rarely possess proper difference frequencies to make the detected output of one circuit of sufficiently the same frequency as the detected output of the other circuit to operate the comparator circuits at dot-dash speeds. Similarly the system is highly selective against tonally modulated systems in combination with each other or with continuous waves.

The system is operable only by the peculiar and specially related radiations from transmitters of the type disclosed in this invention. Interference is rendered highly ineffective even by signals produced by transmitters such as those shown in U. S. Patents 1,681,293 to John Hays Hammond, Jr. and 1,690,719 to Emery L. Chaffee et al. with the proper carrier and superaudible modulation frequencies because of the phase distinctions produced by the present invention.

It is to be understood that the present invention is to be considered to be limited only to the broad idea of a transmitter capable of producing radiations with properties intermediate between those of amplitude modulated signals and phase or frequency modulated signals and a receiver with maximum response for the intermediate conditions and substantially zero response for the amplitude or phase modulated conditions.

Although only a few of the various forms in which this invention may be embodied have been shown herein, it is to be understood that the invention is not limited to any specific construction but might be embodied in various forms without departing from the spirit of the invention or the scope of the appended claims.

We claim:

1. In a signalling system, transmitting means for producing and transmitting carrier energy and higher and lower first order side frequency energies, phase varying means for varying the phase of at least one of said energies, in accordance with signals desired to be transmitted, a receiver for receiving transmitted carrier energy and higher and lower first order side frequency energies, said receiver including means for producing from the received energy two currents, one by demodulating the carrier and the higher side frequency and the other by demodulating the carrier and the lower side frequency, a phase operated indicating device, and means for feeding said two currents to said device, said phase indicating device being arranged so as to provide an indication which is a function of the phase relation between the phase of the received carrier and that of the resultant of its side frequency energies, and so that the indication thereof aproaches substantially the same predetermined value both when the relations between the carrier and side frequency energies received approach the relations characteristic of amplitude modulation and when the relations between the carrier and the side frequency energies received approach the relations characteristic of timing modulation.

2. A method of signalling which comprises generating carrier frequency energy, generating modulation frequency energy, modulating a part of the carrier energy with the modulation energy to produce upper and lower side frequency energies, radiating said side frequency energies together with another part of said carrier energy, phase modulating at least one of said radiated energies at telegraphic rate for signalling, receiving the transmitted radiated energy, separately producing therefrom energy representing the carrier and upper side frequency energy and energy representing the carrier and lower side frequency energy, separately detecting each of the so separately produced energies to produce therefrom two modulation frequency voltages of the same frequency, but having a relative phase varying in accordance with said telegraphic phase modulations, and indicating the changes of relative phases of the two produced modulation frequency voltages.

3. The steps in a method of signalling which comprise, generating carrier frequency energy, generating modulation frequency energy, modulating a part of the carrier energy with the modulation energy to produce upper and lower side frequency energies, radiating said side frequency energy together with another part of said carrier energy, phase modulating at least one of said radiated energies at telegraphic rate for signalling, receiving the transmitted radiated energy, separately producing therefrom energy representing the carrier and upper side frequency energy and energy representing the carrier and lower side frequency energy, separately detecting each of the so separately produced energies to produce therefrom two modulation frequency voltages of the same frequency but having a relative phase varying in accordance with said telegraphic phase modulation, combining the two produced modulation frequency voltages to produce a first resultant voltage which is the vector sum thereof, and a second resultant voltage which is the vector difference therebetween, separately rectifying the first and second resultant voltages to produce a pair of rectified voltages, comparing said rectified voltages and producing from the numerical difference thereof comprehensible signals.

4. The steps in a method of signalling which comprise, generating a carrier frequency current, generating a modulation frequency current, modulating the carrier by the modulating current to produce side frequencies, radiating carrier and side frequency energies, controlling the phase relation between the radiated carrier energy and the carrier energy which was modulated by the modulating current for purposes of signalling, receiving the transmitted radiated energy, separately producing from the received energy corresponding energy with the lower side frequencies suppressed, and corresponding energy with the higher side frequencies suppressed, separately detecting the two separately produced energies to produce therefrom two modulation frequency voltages of the same frequency, but with a phase difference governed in part by the first mentioned phase relation, and producing a comprehensible signal changing in strength in accordance with the last mentioned phase difference.

5. The method of signalling described in claim 3 and including the step of frequency modulating artificially and not in accordance with the signal at least one of the two first named frequencies.

6. The steps in a method of signalling which comprise generating carrier frequency energy, generating modulating frequency energy, transmitting one portion of the carrier energy and the modulation energy to a modulator and producing side frequency energy therefrom, transmitting another portion of the carrier energy and also the side band energy to a distant receiver, controlling the phase difference of the two portions of the carrier energy in accordance with signals desired to be transmitted, selecting from the energy received at the distant receiver one portion representing carrier and upper side frequency energy, and another portion representing carrier and lower side frequency energy, separately detecting the two portions of received energy to produce therefrom two modulation frequency voltages of the same frequency but having a phase difference varying in accordance with signalling changes of phase difference of the two carrier frequency portions at the transmitter, and indicating the variations of said phase difference.

7. The method of signalling described in claim 6 wherein the indication is produced by separately producing voltages corresponding to the vector sum and to the vector difference of said modulating frequency voltages, rectifying the separately produced voltages, and indicating the numerical difference of the said rectified voltages.

8. The steps in a method of signalling which comprise, generating a carrier frequency current, generating a modulation frequency current, modulating the carrier with the modulation current to produce side frequencies, radiating said carrier and side frequencies, controlling the phase relation between the carrier and the side frequencies for signalling purposes, receiving the transmitted energy, selecting from the received energy the carrier and the accompanying upper side frequencies, separately selecting from the received energy the carrier and accompanying lower side frequencies, separately detecting each of the so selected portions of the frequency spectrum to produce therefrom two modulation frequency voltages of the same frequency but having a relative phase determined by said first named phase relation, combining the two produced modulation frequency voltages to produce a first resultant voltage which is the vector sum thereof, combining the two produced modulation frequency voltages to produce a second resultant voltage which is the vector difference therebetween, separately rectifying said first and second resultant voltages to produce a pair of rectified voltages therefrom and comparing said rectified voltages and indicating therefrom said first named phase relation.

9. The method described in claim 8 wherein signalling is effected by shifting the phase relation between the carrier and the side frequencies from a normal value forward and backward by equal amounts, the normal phase relation being that phase relation between the carrier and side frequencies which exists between carrier and side frequencies in an amplitude modulated signal.

10. The method described in claim 8 wherein signalling is effected by shifting the phase relation between the carrier and the side frequencies from a normal value forward and backward by equal amounts, the normal phase relation being that phase relation between the carrier and side frequencies which exists between carrier and side frequencies in a phase modulated signal.

11. The method described in claim 8 which includes the step of fluctuating at least one of the two first named frequencies.

12. The steps in a method of signalling which comprise, generating a carrier frequency current, generating a modulation frequency current, modulating the carrier with the modulation current to produce side frequencies, radiating the carrier and side frequencies, shifting the phase relation between the carrier and the side frequencies from a normal value forward and backward in accordance with signals desired to be transmitted, intercepting the transmitted energy, selecting from the intercepted energy the carrier and its accompanying upper side frequencies, separately selecting from the received energy the carrier and accompanying lower side frequencies, separately detecting each of the so selected portions of the frequency spectrum to produce therefrom two modulation frequency voltages of the same frequency but having a relative phase determined by said first named variation of phase relation, combining the two produced frequency voltages to produce a first resultant voltage which is the vector sum thereof and a second resultant voltage which is the vector difference thereof, separately rectifying said first and second resultant voltages to produce therefrom a pair of rectified voltages, adjusting the phase of said produced two modulation frequency voltages of the same frequency so that a predetermined relation exists between said pair of rectified voltages in the presence of said normal phase relation between the carrier and the side frequencies, and comparing said rectified voltages to indicate the extent and direction of the phase shift corresponding to the signals desired to be transmitted.

13. The method of radio signalling which comprises generating carrier frequency energy and modulation frequency energy, modulating a part of the carrier energy with the modulation energy to produce upper and lower sidebands, radiating another part of the carrier energy and said upper and lower sidebands, varying the nature of the modulation represented by the transmitted carrier energy and sidebands without changing the strength of either thereof, receiving the radiated energy and producing therefrom an indication which is a minimum when the received radiations represent either amplitude or phase modulation and a maximum when the received radiations represent both said types of modulation, each type being of approximately half the possible extent of modulation.

14. The steps in a method of radio signalling which include, generating carrier frequency energy and modulation frequency energy, modulating a portion of the carrier energy with the modulation energy to produce upper and lower side frequencies, radiating another portion of the carrier energy and the produced side frequencies, varying the nature of the modulation represented by the transmitted carrier and side frequencies between a condition representing amplitude modulation and a condition representing both phase and amplitude modulation, receiving the radiated energy and producing therefrom an indication which is a minimum when the received radiations represent amplitude modulation and of increasing magnitude as the ratio of the amplitude and phase modulation of the received radiation approaches unity.

15. A method of signalling which comprises generating carrier frequency energy, generating modulation frequency energy, modulating a part of the carrier energy with the modulation energy to produce upper and lower side frequency energies, radiating said side frequency energies together with another part of said carrier energy, phase modulating at least one of said radiated energies in accordance with signals desired to be transmitted, receiving the transmitted energy, deriving therefrom energy representing the carrier and upper side frequency energy and energy representing the carrier and lower side frequency energy, detecting the energy representing the carrier and upper side frequency energy, advancing the voltage of said detected energy 45°, detecting the energy representing the carrier and lower side frequency energy and retarding the voltage of said last named detected energy 45°, combining a part of the advanced detected energy with a part of the retarded detected energy to produce energy which corresponds to the vector difference thereof, combining another part of the advanced energy and another part of the retarded energy to produce energy which corresponds to the vector sum thereof and indicating the changes of relative phases of said vector difference and vector sum energies.

16. In a signalling system, means for generating carrier frequency energy, means for generating modulation frequency energy, means including a carrier suppression modulator for modulating a part of the carrier energy with the modulation energy to thereby produce upper and lower side frequency energies, means for radiating said side frequency energies together with another part of said carrier energy and means for phase modulating at least one of said radiated energies in accordance with signals desired to be transmitted.

17. In a signalling system as described in the next preceding claim, means for receiving the transmitted energy, means for separating and detecting the carrier and upper side frequency energy and carrier and lower side frequency energy, means for phase advancing the voltage of the detected carrier and upper side frequency energy, means for phase retarding the voltage of the detected carrier and lower side frequency energy, means for combining the two resulting energies so as to produce energy which corresponds to the vector difference and vector sum thereof and means for indicating the changes of relative phases of said vector sum and vector difference energies.

18. A signaling system as described in claim 1 wherein the phase operated indicating device is arranged so that its indication approaches zero both when the relations between the carrier and side frequency energies received approach the relations characteristic of amplitude modulation and when the relations between the carrier and the side frequency energies received approach the relations characteristic of timing modulation.

JOHN HAYS HAMMOND, JR.
ELLISON S. PURINGTON.